United States Patent [19]

Matsui et al.

[11] Patent Number: 5,794,082
[45] Date of Patent: Aug. 11, 1998

[54] ELECTRONIC FLASH DEVICE WITH SLAVE EMISSION FUNCTION

[75] Inventors: Hideki Matsui, Fujisawa; Hiroshi Sakamoto, Kawasaki; Nobuyoshi Hagiuda, Yokohama, all of Japan

[73] Assignee: Nikon Corporation, Tokyo, Japan

[21] Appl. No.: 786,961

[22] Filed: Jan. 23, 1997

Related U.S. Application Data

[63] Continuation of Ser. No. 503,496, Jul. 18, 1995, abandoned.

[30] Foreign Application Priority Data

| Aug. 24, 1994 | [JP] | Japan | 6-199867 |
| Aug. 24, 1994 | [JP] | Japan | 6-199868 |
| Aug. 25, 1994 | [JP] | Japan | 6-200491 |
| Aug. 25, 1994 | [JP] | Japan | 6-200493 |

[51] Int. Cl.$^6$ ............ G03B 7/00; G03B 15/05; G03B 15/03
[52] U.S. Cl. ............ 396/56; 396/171; 396/182; 396/187
[58] Field of Search ............ 359/413, 415–16, 359/131, 132; 396/56, 171, 182, 187

[56] References Cited

U.S. PATENT DOCUMENTS

| 4,368,966 | 1/1983 | Hagyuda | 354/33 |
| 5,016,037 | 5/1991 | Taniguchi et al. | 354/413 |
| 5,384,611 | 1/1995 | Tsuji et al. | 354/131 |

*Primary Examiner*—Michael L. Gellner
*Assistant Examiner*—Daniel Chapik

[57] ABSTRACT

An electronic flash device with a slave emission function, includes a light-receiving circuit unit for starting slave emission in response to the steep leading edge of an optical signal, a light-emitting unit for irradiating illumination light for a photographing operation onto an object, an attachment member to a camera, for detecting the attachment state of the to the camera, and light emission stopping means for, when the detects that the attachment member is mounted on the camera, stopping the light emission by the light-emitting unit in response to light received by the light-receiving circuit unit.

16 Claims, 6 Drawing Sheets

ELECTRONIC FLASH DEVICE WITH SLAVE EMISSION FUNCTION

This application is a continuation of application Ser. No. 08/503,496, file Jul. 18, 1995, now abandoned.

BACKGROUND OF THE INVENTION

1. Field of the Invention

The present invention relates to an electronic flash device with a slave emission function.

2. Related Background Art

Conventionally, an adapter, called a wireless multiple-flash adapter or a slave unit, for wireless of an electronic flash device for emitting light is available. In this adapter, upon reception of a steep change in light by a light-receiving element, a switching element is turned on in response to this light, and a synchronous signal is output to control an electronic flash device connected to the adapter to emit light. Therefore, in a multiple-flash photographing operation using a plurality of electronic flash devices for illumination, the adapter and the electronic flash devices can be conveniently disposed at arbitrary positions. As the adapter, a stand-alone adapter and an adapter built in an electronic flash device are available. As an example of an adapter built in an electronic flash device, in Japanese Laid-Open Utility Model Application No. 56-3527, a light-receiving element for slave emission is disposed in the same direction as the optical axis of a light-emitting portion. On the other hand, as described in Japanese Laid-Open Patent Application No. 55-153927, a device which has a delay circuit inserted between a photosensitive element and a switching element is also proposed.

In the above-mentioned prior art, when the slave function of an electronic flash device which is set to be a master unit is enabled, it undesirably emits light in response to light emitted by another electronic flash device although it is the master unit.

In this case, the emitted light does not contribute to a photographing operation at all, and merely wastefully consumes a battery.

In the above-mentioned prior art, when light that is strong enough to saturate the amplifier in a light-receiving circuit unit is input, the light-receiving circuit unit may output an error signal. In this case, an electronic flash device serving as a slave unit may emit light a plurality number of times in response to the error signal.

In the above-mentioned prior art, the slave unit operates as an independent unit. For this reason, when various TTL light control modes are executed via various data communications with a camera as is the recent trend, the following problems arise posed. More specifically, in the case of TTL light control in which an electronic flash device serving as a master unit performs pre-emission prior to main emission, and performs main emission on the basis of the luminance information of an object, a slave unit emits light in synchronism with the pre-emission, and it cannot emit light in the main emission. As a result, a multiple-flash photographing operation fails. Therefore, a photographer must manually inhibit the pre-emission, and a photographing failure may occur due to, e.g., a setting error.

Furthermore, in the above-mentioned disclosure, the slave unit operates independently. For this reason, when various photographing modes are executed via various data communications is a camera as with the recent trend, many problems arise. More specifically, when a repeating emission operation is selected in the slave emission mode, the shutter speed must correspond to an interval required for the selected number of times of repeating emission. In particular, when a delayed slave emission mode is selected, it may become impossible to complete light emission by the selected number of times during the film exposure.

SUMMARY OF THE INVENTION

It is an object of the present invention to provide an electronic flash device with a slave emission function, which can automatically discriminate whether the electronic flash device is a master unit or a slave unit, and prevents wasteful light emission of the master unit.

It is another object of the present invention to provide an electronic flash device with a slave emission function, which can prevent slave emission from being performed a plurality of times.

It is another object of the present invention to provide an electronic flash device with a slave emission function, which can prevent an emission error even when the device is used in a camera system with a pre-emission function.

It is still another object of the present invention to provide an electronic flash device with a slave emission function, which can easily execute a slave emission photographing operation even when a repeating emission operation is selected in a slave emission mode.

In order to achieve the above objects, according to the first aspect of the present invention, there is provided an electronic flash device with a slave emission function, comprising: a light-receiving circuit unit for starting slave emission in response to a steep leading edge of an optical signal; a light-emitting unit for irradiating illumination light for a photographing operation onto an object; an attachment member to a camera; detection means for detecting an attachment state of the attachment member to the camera; and light emission stopping means for, when the detection means detects that the attachment member is mounted on the camera, stopping the light emission by the light-emitting unit in response to light received by the light-receiving circuit unit.

The attachment member preferably has an electrical contact. In this case, the detection means preferably detects the attachment state to the camera on the basis of the state of the electrical contact. In addition, the detection means and the light emission stopping means preferably comprise a microcomputer.

In the first aspect of the present invention, the electronic flash device itself automatically discriminates if the device is mounted on the camera. If the devices determines that it is mounted on the camera, even when a slave emission mode is set by a slave function setting switch, the slave emission function is disabled. For this reason, the device does not erroneously emit light upon detection of light emitted by another electronic flash device, and the battery waste can be prevented.

According to the second aspect of the present invention, there is provided an electronic flash device with a slave emission function, comprising: a light-receiving circuit unit for starting slave emission in response to a steep leading edge of an optical signal; a light-emitting unit for irradiating illumination light for a photographing operation onto an object; a timer circuit for starting a measurement operation of a predetermined period of time when the light-receiving circuit unit receives the steep leading edge of the optical signal; and a light reception invalidating circuit for, when the light-receiving circuit unit receives a steep leading edge of another optical signal during the measurement operation of the timer circuit, invalidating the received optical signal.

The timer circuit preferably comprises a software circuit incorporated in a microcomputer. The light reception invalidating means preferably comprises a microcomputer.

In the second aspect of the present invention, since an emission activation signal is ignored for a predetermined period of time starting from the first emission activation signal output from the light-receiving circuit unit, the device can be prevented from emitting light a plurality of times (emission error).

According to the third aspect of the present invention, there is provided an electronic flash device with a slave emission function, comprising: a light-receiving unit for receiving a steep optical signal; a light-emitting unit for slave-emitting illumination light toward an object in response to the optical signal received by the light-receiving unit; an attachment member used for attaching/detaching the device to/from a camera body; a data communication function unit for exchanging various data including photographing information with the camera body via the attachment member, and setting a state allowing pre-emission in response to at least selection by the camera body side of a pre-emission photographing mode in which the pre-emission is performed prior to main emission; and a pre-emission inhibition unit for inhibiting the pre-emission when a slave emission mode is selected even when the pre-emission photographing mode is selected by the camera body side.

Preferably, the data communication function unit realizes TTL light control in which the luminance information of an object is acquired by pre-emission, and main emission is performed on the basis of the acquired information. The data communication function unit and the pre-emission inhibition unit preferably comprise a microcomputer.

In the third aspect of the present invention, even in a camera system which performs pre-emission prior to main emission in a normal photographing operation, when a slave emission mode is selected, the pre-emission is inhibited via data communications with the camera. For this reason, an electronic flash device serving as a slave unit can be prevented from causing an emission error.

According to the fourth aspect of the present invention, there is provided an electronic flash device with a slave emission function, comprising: a light-receiving unit for receiving a steep optical signal; a light-emitting unit for slave-emitting illumination light toward an object in response to the optical signal received by the light-receiving unit; a mode setting unit for selecting an emission mode; and a repeating emission invalidating unit for invalidating setting data of the number of times of emission and an emission frequency, and allowing light emission only once, if a slave emission mode is already selected even when a repeating emission mode for emitting light a plurality of number of times during a film exposure is selected by the mode setting unit.

Preferably, the invalidating operation of the repeating emission invalidating unit is automatically inhibited when the slave emission mode is canceled. The repeating emission invalidating unit preferably comprises a microcomputer.

According to the fifth aspect of the present invention, there is provided an electronic flash device with a slave emission function, comprising: a light-receiving unit for receiving a steep optical signal; a light-emitting unit for slave-emitting illumination light toward an object in response to the optical signal received by the light-receiving unit; mode setting means for selecting an emission mode; an attachment member used for attaching/detaching the device to/from a camera body; a data communication function unit for exchanging various data including photographing information with the camera body via the attachment member, and setting a state allowing repeat emission in response to at least selection by the camera body side of a repeating emission mode in which light emission is performed a plurality of times during a film exposure; and a repeating emission invalidating unit for invalidating setting data of the number of times of emission and an emission frequency, and allowing light emission only once, if a slave emission mode is already selected by the mode setting means even when the repeating emission mode is selected by the camera body side.

Preferably, the invalidating operation of the repeating emission invalidating unit is automatically inhibited when the slave emission mode is canceled. The data communication function unit and the repeating emission invalidating unit preferably comprise a microcomputer.

In the fourth and fifth aspects of the present invention, since the repeating emission mode is invalidated in principle in a slave emission mode, no troublesome calculation for calculating the number of times of emission during a film exposure is required.

The above and other objects, features and advantages of the present invention are explained hereinafter and may be better understood by reference to the drawings and the descriptive matter which follows.

DETAILED DESCRIPTION OF THE PREFERRED EMBODIMENTS

Figure 1C:
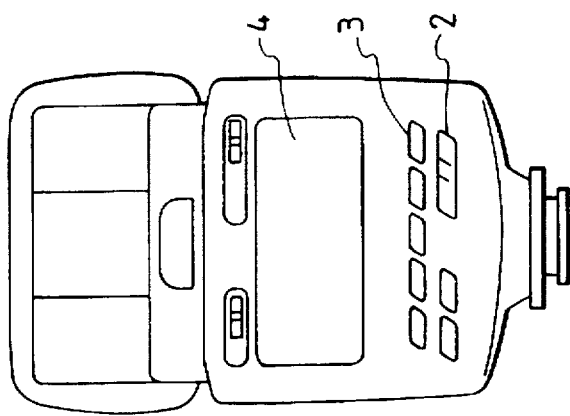
FIG. 1C is a rear view of the electronic flash device according to the embodiment of the present invention.
Figure 1B:
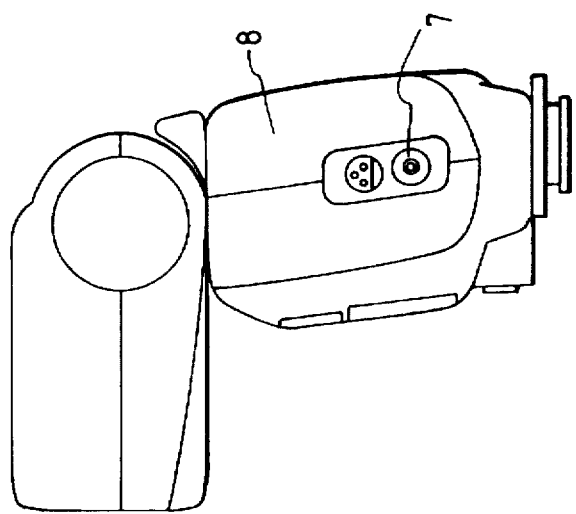
FIG. 1B is a side view of the electronic flash device according to the embodiment of the present invention.
Figure 1A:
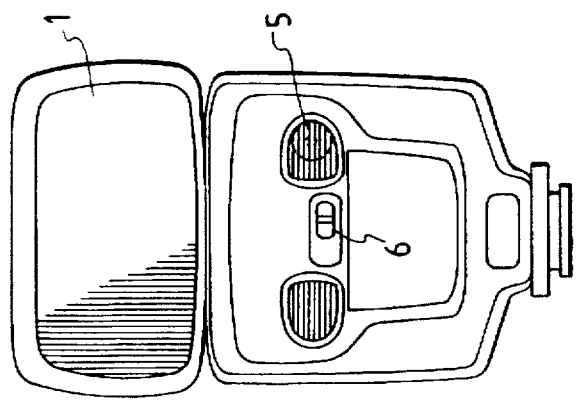
FIG. 1A is a front view of an electronic flash device according to an embodiment of the present invention.
Figure 2:
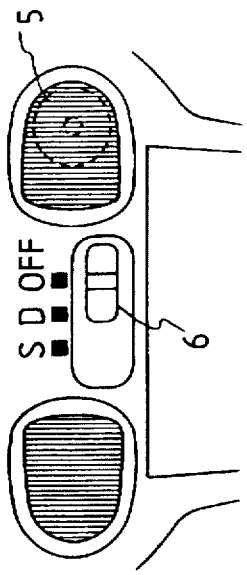
FIG. 2 is a view showing the outer appearance of a slave function setting switch of the electronic flash device according to the embodiment of the present invention.

Referring to FIGS. 1A to 1C, a light-emitting portion 1 is vertically and horizontally rotatable with respect to a main body 8, and can attain a photographing operation using bounced light. Light-receiving portions 5 for a slave function (to be described later), and a slave function setting switch 6 are disposed adjacent to each other on the front surface of the main body 8. The slave function setting switch 6 has three positions "S", "D", and "OFF", as shown in FIG. 2. A synchronous terminal 7 for a slave unit is arranged on the side surface of the main body 8. A power switch 2, various setting switches 3, and an LCD display unit 4 are disposed on the rear surface of the main body 8.

The electronic flash device has the following slave functions.

(1) Slave S Mode

When the S mode is set, the device emits light with a minimum delay in response to the steep leading edge of an optical signal from another speed light (electronic flash device), which signal is received by the light-receiving portions 5. This mode is a slave emission mode which is known to those who are skilled in the art.

(2) Slave D Mode

When the D mode is set, the device emits light after a predetermined delay time from the steep leading edge of an optical signal from another speed light, which signal is received by the light-receiving portions 5.

The setting operation of the above-mentioned slave modes and the actual operations will be described in turn below. FIG. 2 is an enlarged view of the slave function setting switch 6. The slave function setting switch 6 is a slide switch, and has three positions, i.e., the above-mentioned positions "S" and "D", and a position "OFF" at which the slave function is not selected. In FIG. 2, the position "OFF" is selected.

Figure 3:
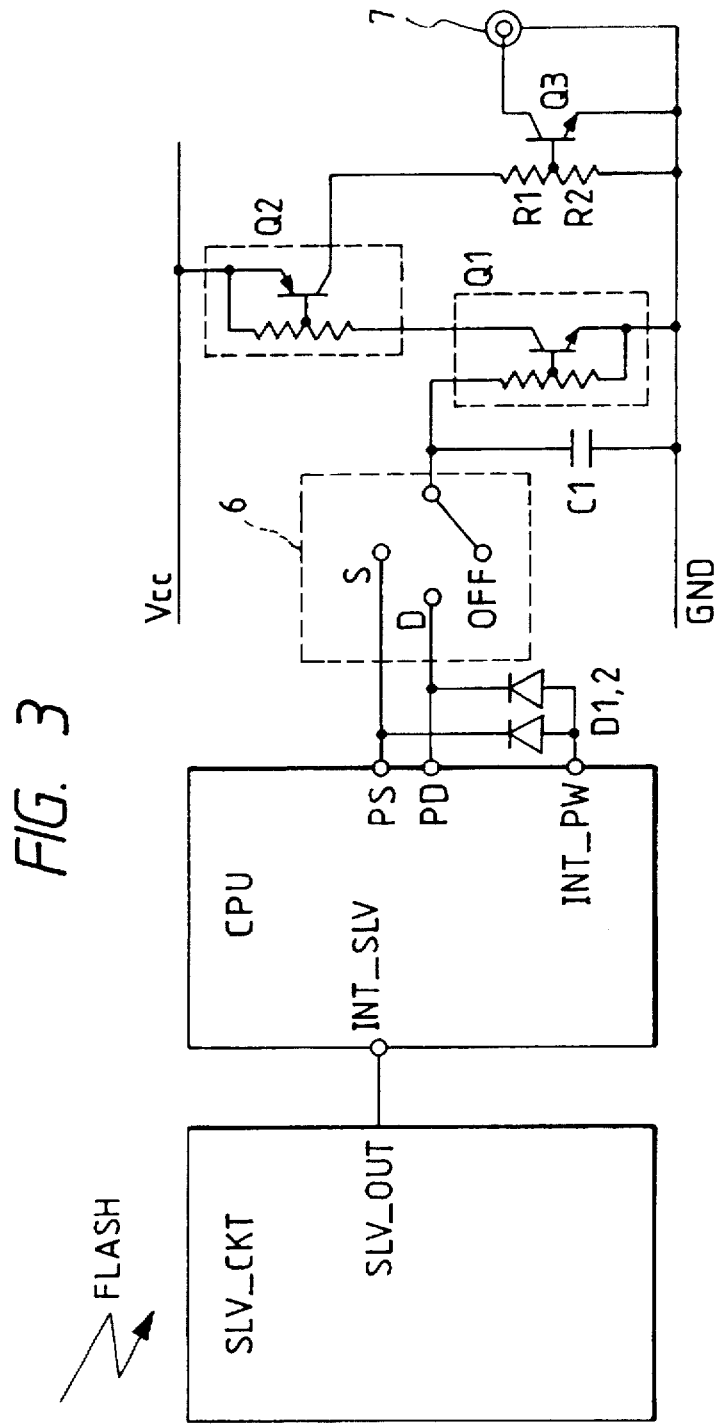
FIG. 3 is a circuit diagram showing the electrical circuit arrangement of the electronic flash device according to the embodiment of the present invention.

The slave function setting switch 6 is connected to the circuit shown in FIG. 3. A microcomputer (to be referred to as a CPU hereinafter) which controls the electronic flash device has four ports associated with the slave function. A light-receiving circuit SLV_CKT converts the steep leading edge of an optical signal received by the light-receiving portions 5 into a pulse signal, and the CPU receives the output from the circuit SLV_CKT at an interrupt input terminal INT_SLV. Terminals S and D of the slave function setting switch 6 are connected to I/O ports PS and PD of the CPU, and an OR of the ports PS and PD is connected to an interrupt input terminal INT_PW via diodes D1 and D2.

The CPU shown in FIG. 3 incorporates a software timer circuit. When the circuit SLV_CKT receives a steep light input from another electronic flash device, and outputs a signal from its terminal SLV_OUT to the terminal INT_SLV of the CPU, the internal timer circuit of the CPU starts a time measurement operation, and another signal or signals input from the circuit SLV_CKT to the terminal INT_SLV is or are ignored during the time measurement operation by the timer circuit.

The slave function setting switch 6 is a non-shorting type switch. Therefore, one of the ports PS and PD of the CPU is connected to the base of a resistor built-in transistor Q1, or the base of the resistor built-in transistor Q1 is opened at the position "OFF". A capacitor C1 serves to absorb noise, and may be omitted. As the capacitance of the capacitor C1, a relatively small capacitance is selected so as not to cause a signal delay.

The collector output of the resistor built-in transistor Q1 is connected to the base of a resistor built-in transistor Q2, and the collector output of the resistor built-in transistor Q2 can supply a current high enough to drive a transistor Q3. Since the transistor Q3 directly drives a synchronous signal, a small-to-medium power transistor having a high withstand voltage is selected with a margin so as to match with electronic flash devices having various terminal voltages. Therefore, a resistor built-in transistor is not used, but resistors R1 and R2 are externally connected to the transistor Q3. As shown in FIG. 1B, the synchronous terminal 7 serves as an output terminal for a slave unit of the electronic flash device, and is also connected to a synchronous signal input terminal (not shown) of the electronic flash device. Therefore, the CPU outputs signals from the ports PS and PD to activate light emission by itself via the slave function setting switch 6 and the transistors Q1 to Q3. More specifically, the electronic flash device can perform normal light emission in response to a synchronous signal from a camera, and light emission by the above-mentioned slave function.

Figure 4:
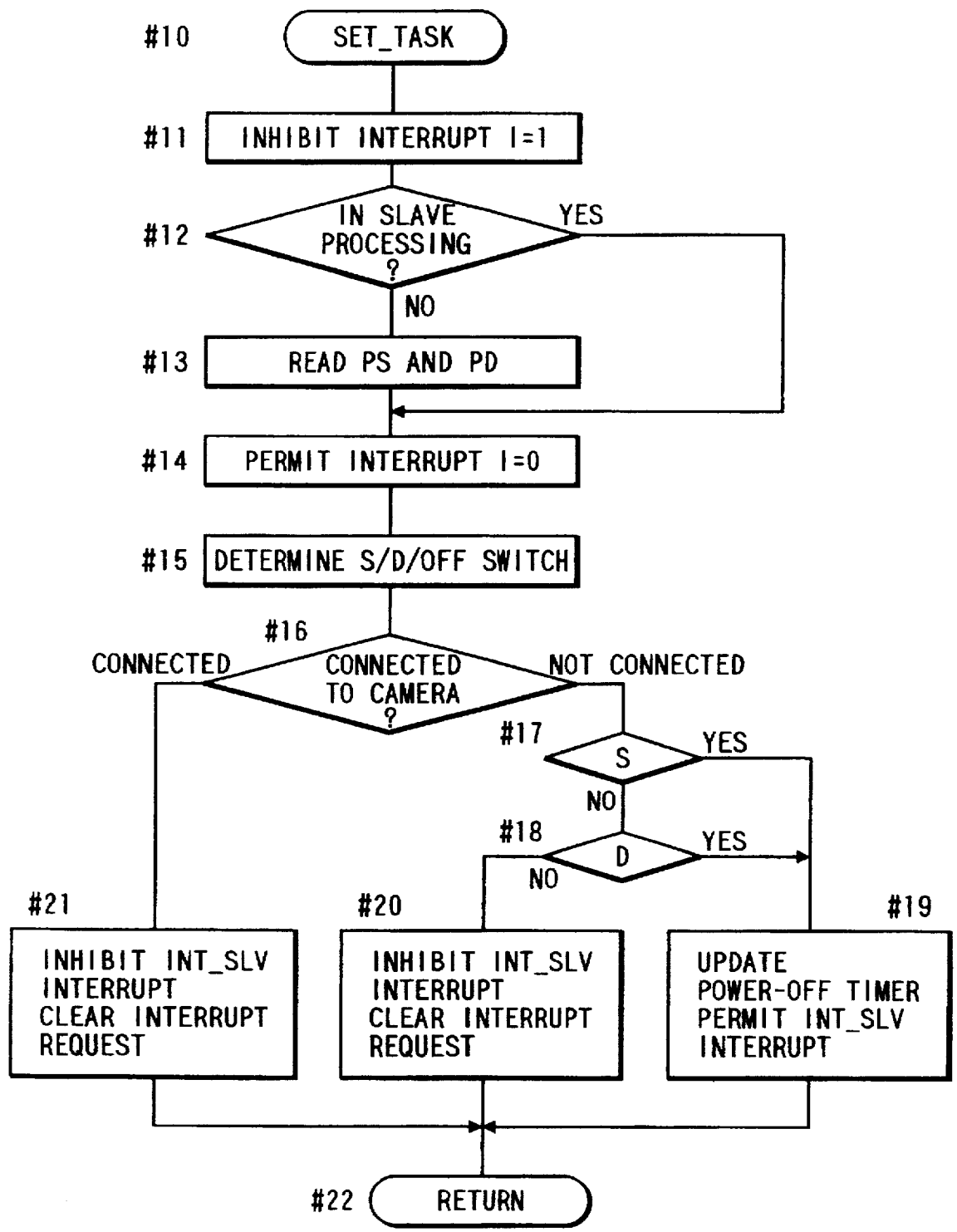
FIG. 4 is a flow chart of software of a microcomputer of the electronic flash device according to the embodiment of the present invention, i.e., showing slave function setting processing.

The operation of the slave function will be explained below as well as the software of the CPU. Note that symbol # in the following description means a step. FIG. 4 shows the flow of the processing associated with the slave function setting operation. This task is executed at predetermined time intervals, and is started when a label in #10 is called. In #11, all interrupts are inhibited. The reason for this inhibition will be explained later. In #12, it is checked if another slave processing is being executed. As the discrimination method for this purpose, a flag (not shown) is used, and is activated only during execution of slave processing. If NO in #12, since the ports PS and PD as the slave function setting switch 6 are not being accessed by the task of another slave processing, port status data can be read in #13. Even if the light-receiving circuit SLV_CKT receives effective light at this instance and triggers the interrupt input terminal, since the interrupts have been inhibited in #11 in this state, the read operation of port data is not disturbed by the task of another slave processing.

In the read operation of port data, the I/O direction registers of the ports are set in the input mode. At this time, the ports are pulled up and port data are retrieved and read. After the data registers of the ports are set at L, the direction registers are set in the output mode. In this manner, the port data can be read without supplying any output to the transistor Q1. Therefore, the ports PS and PD are set in an input state during only a given period in #13, and are set to generate outputs L in other ordinary states. In FIG. 3, these ports are active L, since the selected port is grounded via the base terminal of the resistor built-in transistor Q1. In order to allow to the reading of L level in the input mode and to prevent the transistor Q1 from being turned on by a current flowing out from the pull-up element (not shown) for each port, the base-emitter resistance or the like of the transistor Q1 has a sufficiently small value. When these ports are not selected by the slave function setting switch 6, they are open, and change to H level by the above-mentioned pull-up. As a result, outputs H from these ports can be reliably read. In this manner, these ports can serve as both input and output ports.

On the other hand, if it is determined in #12 that slave processing is being executed, since the ports PS and PD may be being accessed by the task of another slave processing, the flow skips #13, i.e., port data are not read.

In #14, the interrupt inhibition state is cancelled. Therefore, since interrupts are inhibited from #11 to #14, the device cannot immediately respond to light received during this interval. However, since the light-emitting timing rarely overlaps this interval, no practical problems are posed.

In #15, the state of the slave function setting switch 6 is determined on the basis of the latest read data. As described above, the port selected by the slave function setting switch 6 is at L level L. When the position "OFF" is selected, since both the ports are open, the mode is determined based on (PS, PD)=(H, H), as shown in Table 1 below. Note that (L, L) is an impossible combination. However, if this state is set, the determined value of the mode is left unchanged, and the immediately preceding discrimination result is used.

TABLE 1

| PS | PD | Determined Mode |
|----|----|-----------------|
| H  | H  | OFF             |
| H  | L  | D Mode          |
| L  | H  | S Mode          |
| L  | L  | Determination Left Unchanged |

Figure 1D:
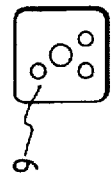
FIG. 1D is a view showing the outer appearance of an attachment member of the electronic flash device according to the embodiment of the present invention.

In #16, the flow branches depending on whether or not the electronic flash device is connected to the camera. This branching step is importantly. The, electronic flash device connected to the camera must not perform light emission in response to light emission of another electronic flash device since it is the master flash device. On the contrary, any electronic flash device which is not connected to the camera must perform slave emission since it is a slave unit. In #16, it is checked based on the state of electrical contacts 9 provided to an attachment member shown in FIG. 1D if the device is connected to the camera.

Figure 9:
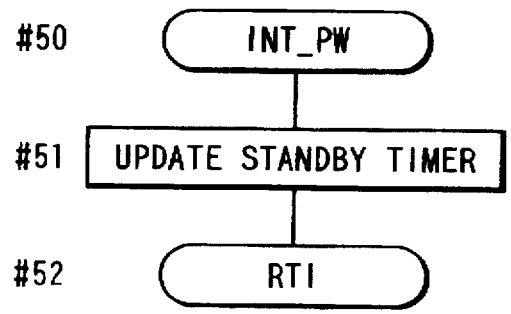
FIG. 9 is a flow chart of software of the microcomputer of the electronic flash device according to the embodiment of the present invention, i.e., showing INT_PW terminal interrupt processing.
Figure 7:
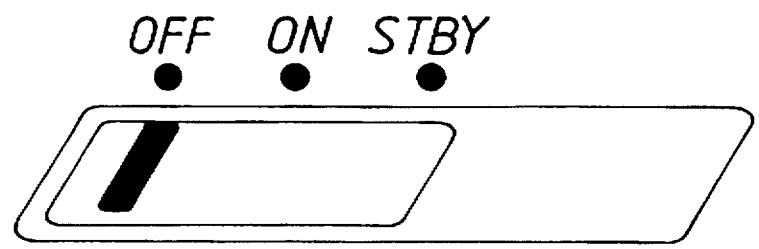
FIG. 7 is an enlarged view showing the outer appearance of a power switch of the electronic flash device according to the embodiment of the present invention.

Processing in #17 and subsequent steps in a case wherein the device is not connected to the camera will be explained below. In this case, slave emission must be performed depending on the selected mode, as described above. If it is determined in #17 or #18 that the S or D slave emission mode is selected, the flow advances to #19 to execute the two processing operations. First, a power-OFF timer of the electronic flash device is updated to prevent the timer from automatically turning off the power supply in a non-operational state. FIG. 7 is an enlarged view of the power switch 2 shown in FIG. 1C. When a non-operation state continues for 80 seconds while the power switch 2 is set at a position "STBY", the power supply of the electronic flash device is turned off to cut the consumption power current. If the electronic flash device is connected to the camera, the power supply of the electronic flash device is resumed by, e.g., the electrical contacts 9 shown in FIG. 1D in cooperation with the start of the power supply of the camera. However, since the electronic flash device as a slave unit is an independent unit, it cannot be activated by the camera. Therefore, in order to inhibit the device from being turned off even when the power switch 2 is set at the position "STBY", the power-OFF timer for counting up to 80 seconds is always updated and kept to be 0. On the contrary, when the slave function setting switch 6 is switched from the position "OFF" to the position "S" or "D" while the power switch 2 is set at the position "STBY" and the electronic flash device is OFF, the power supply of the electronic flash device must be restored to an ON state. In the circuit diagram shown in FIG. 3, since the terminal INT_PW of the CPU is connected to the port PS or PD via the diodes D1 and D2, if a trailing edge interrupt of the terminal INT_PW is enabled before a restartable power-OFF state, the CPU can be enabled upon operation of the slave function setting switch 6, and the electronic flash device can be restored to the ON state. When the power supply is turned off by manually operating the power switch 2 to a position "OFF", since it is a forced power-OFF operation, the above-mentioned trailing edge interrupt of the terminal INT_PW is not enabled. Note that the interrupt processing of the terminal INT_PW is started by jumping to an interrupt vector in #50, as shown in FIG. 9. A standby timer is updated in #51, and the flow returns from the interrupt in #52. Since the timer is updated in #51, the power supply is not immediately turned off immediately after activation. Thereafter, since the standby timer is kept updated by the processing shown in FIG. 4, the power supply is not turned off even when the electronic flash device is set in the standby mode.

The other processing in #19 is to enable an interrupt of the terminal INT_SLV. If the light-receiving circuit SLV_CKT shown in FIG. 3 outputs an H pulse upon reception of light, the terminal INT_SLV must be interrupted in response to a leading edge. Therefore, after #19, slave emission is enabled.

On the other hand, if it is determined in #17 and #18 that the slave mode is OFF, the flow advances to #20 to inhibit the interrupt of the terminal INT_SLV and to clear the interrupt request. Therefore, since no interrupt is generated, a series of slave function operations will not be executed.

In this manner, the setting operation of the slave function of the electronic flash device, which is not connected to the camera, is completed, and the flow returns in #22.

On the other hand, if it is determined in #16 that the electronic flash device is connected to the camera, the flow advances to #21. As described above, since the master flash device does not perform slave emission, the interrupt of the terminal INT_SLV is inhibited and the interrupt request is cleared as in #20. Thereafter, the flow returns in #22.

As described above, the processing associated with the slave function setting operation is completed.

Figure 5:
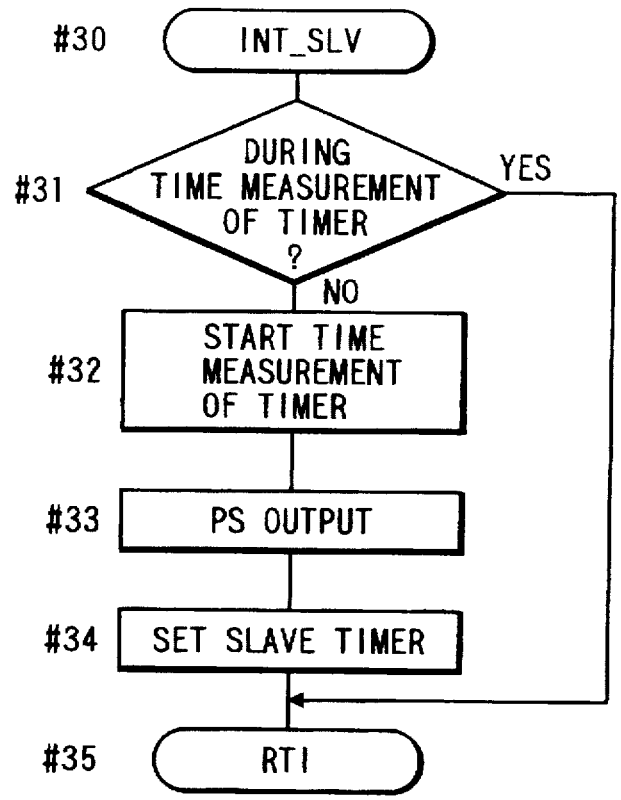
FIG. 5 is a flow chart of software of the microcomputer of the electronic flash device according to the embodiment of the present invention, i.e., showing INT_SLV interrupt processing.

Next, the processing from when the light-receiving circuit SLV_CKT receives light until the electronic flash device performs slave emission will be explained below. FIG. 5 shows the INT_SLV interrupt processing. In #31 immediately after the interrupt processing is started in #30, the timer circuit is checked to see if it is executing a time measurement operation. If YES in #31, since an H-level signal has already been output to the port PS, restoration processing from the interrupt is executed in #35, and the flow returns to the main routine. On the other hand, if NO in #31, the flow advances to #32 to start the time measurement operation of the timer circuit. In #33, an H-level signal is output from the port PS. Since the port PS is normally set to output an L-level signal, an H-level signal can be immediately output by changing the data register to H. In practice, since a bit operation command is used, and various registers can be prevented from being destroyed, an output to the port may be executed prior to saving of the register normally executed in #30. Therefore, the number of commands inserted from when the INT_SLV interrupt is generated until the port PS changes is minimum, and a quick response can be made by fully utilizing the CPU performance.

If the slave function setting switch 6 is set in the S mode, the transistors Q1, Q2, and Q3 are turned on in turn in response to the H-level output from the port PS, and a synchronous signal is output. In response to this signal, the electronic flash device itself and another electronic flash device or devices connected to the synchronous terminal 7 can perform emission.

Figure 8:
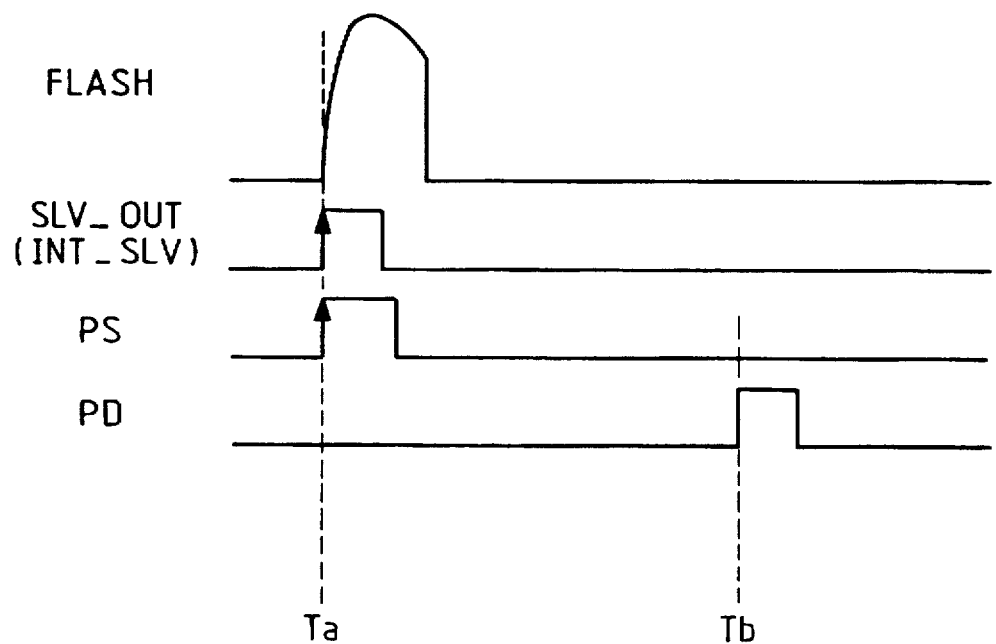
FIG. 8 is a timing chart upon execution of a slave function of the electronic flash device according to the embodiment of the present invention.

FIG. 8 is a timing chart showing this state. As shown in FIG. 8, a signal is input to the INT_SLV terminal at the leading edge of a light-emission waveform FLASH, and an H-level signal is output from the port PS with almost no delay time, as described above.

Referring back to FIG. 5, the port PS is reset to L in #33, and a slave timer for forming a delay time for the D mode is set in #34. For example, 1 ms longer than the flash time of the electronic flash device is set in the slave timer. This slave timer generates a timer interrupt after an elapse of the setting time.

In #35, restoration processing from the interrupt is performed, and the flow returns. As described above, the slave processing in the S mode is completed. If the slave function setting switch 6 is set in the D mode, since the port PS is not connected to any circuit on its output side, it does not operate, and is completely isolated from the circuitry for the S mode.

Figure 6:
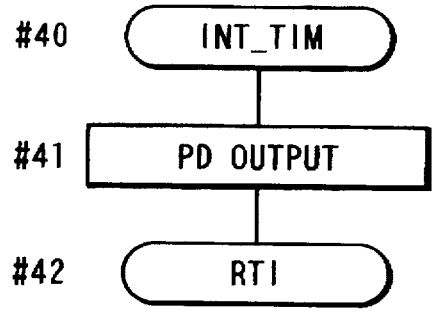
FIG. 6 is a flow chart of software of the microcomputer of the electronic flash device according to the embodiment of the present invention, i.e., showing INT_TIM interrupt processing.

In the case of the D mode, after an elapse of the slave timer time, a timer interrupt is generated at time Tb in FIG. 8, and INT_TIM processing in FIG. 6 is started in #40. When an H-level signal is output to the port PD in #41, this signal immediately generates a synchronous signal.

As can be seen from FIG. 8, after the light emission of the master flash device is stopped by automatic light control, the synchronous signal for the D mode is generated. Therefore, the slave emission in the D mode is independently performed without influencing the light control, such as TTL automatic light control, of the master flash device.

Figure 10:
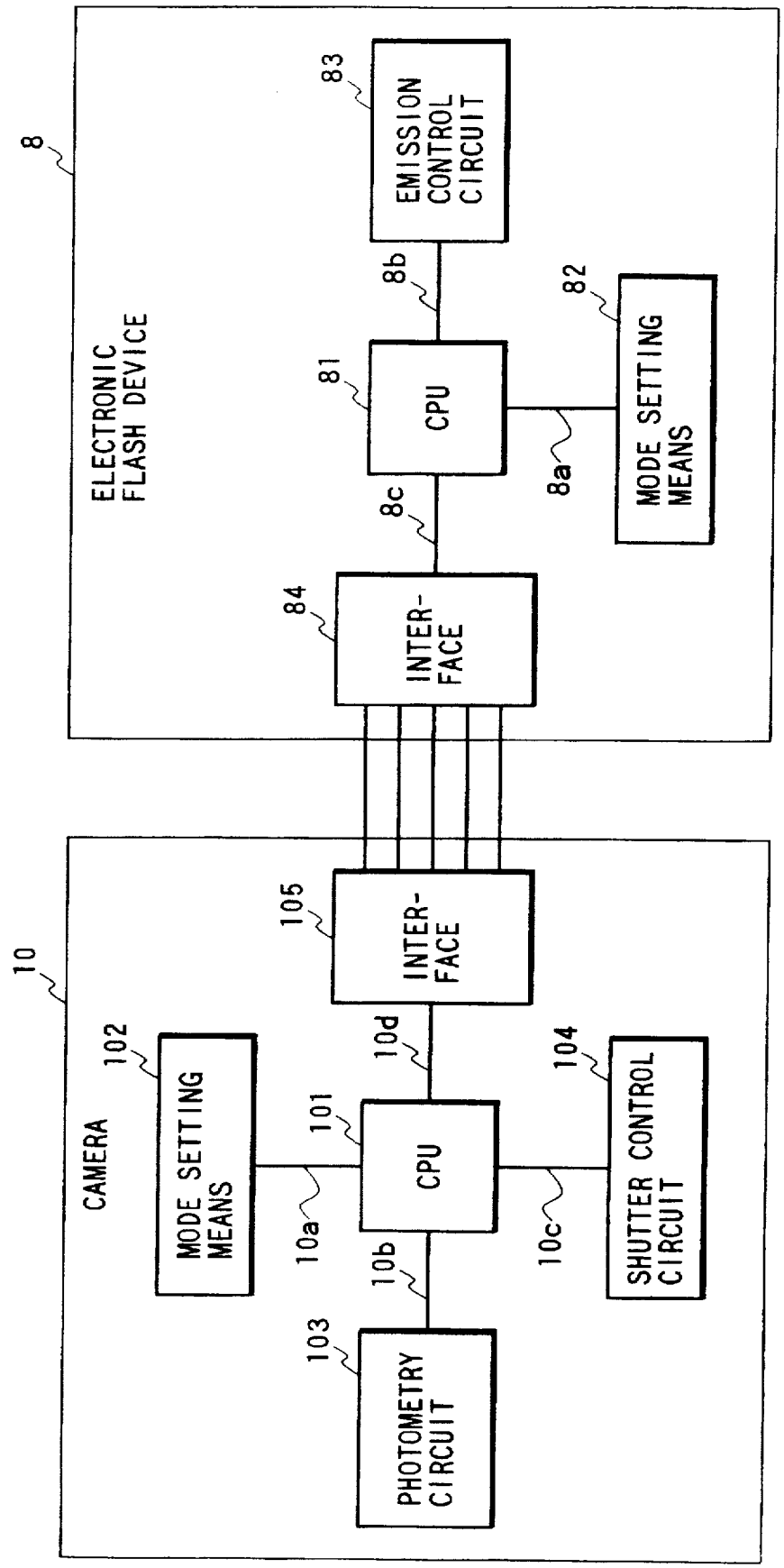
FIG. 10 is a block diagram showing an electronic flash device according to the present invention, and a camera to which the device is connected.

FIG. 10 shows the schematic arrangement of the camera and the electronic flash device. A camera 10 comprises at least a CPU 101 as a central function for instructing operations, mode selection means 102 for selecting a photographing mode, a photometry circuit 103 for measuring the brightness of an object under steady light and when the electronic flash device is used, a shutter control circuit 104 for controlling the shutter speed, and an interface 105 which is electrically connected to the electronic flash device to exchange various kinds of information. The CPU 101 and the mode setting means 102 are connected via a connection line 10a, and the CPU 101 and the photometry circuit 103 are connected via a connection line 10b. The CPU 101 and the shutter control circuit 104 are connected via a connection line 10c, and the CPU 101 and the interface 105 are connected via a connection line 10d. An electronic flash device 8 comprises at least a CPU 81 as a central function for instructing operations, mode setting means 82 for selecting a light emission mode, an emission control circuit 83 including a light emission tube and a control for the light emission amount from the light emission tube, and an interface 84 which is electrically connected to the camera to exchange various kinds of information. The CPU 81 and the mode setting means 82 are connected via a connection line 8a. The CPU 81 and the emission control circuit 83 are connected via a connection line 8b. The CPU 81 and the interface 84 are connected via a connection line 8c.

When a TTL light control mode including pre-emission is selected by the mode setting means 102 of the camera 10, information indicating this mode is transmitted to the CPU 101 via the line 10a, and is also transmitted to the interface 105 via the line 10d. Then, the information is transmitted from the interface 105 of the camera 10 to the interface 84 of the electronic flash device 8 via an electrical contact. In this state, if the mode setting means 82 (including the slave function setting switch 6 shown in FIG. 1) selects the slave mode, the information indicating this mode is transmitted to the CPU 81 via the line 8a. Meanwhile, the CPU 81 has recognized the setting state of the camera 10 via data communications. If the camera 10 has already stated the light control mode including the pre-emission, the CPU 81 supplies a signal (flag) for inhibiting the pre-emission to the interface 84 via the line 8c, and this signal is transmitted to the camera 10. In the camera 10, the signal received via the interface 105 is transmitted to the CPU 101 via the line 10d. In this manner, upon reception of the above-mentioned flag, the camera 10 does not perform pre-emission prior to main emission.

In a state wherein a delayed slave emission mode is selected by the mode setting means 82 of the electronic flash device, if a repeating emission mode is additionally selected, the information indicating this selection is transmitted to the CPU 81 via the line 8a. The CPU 81 preferentially sets the previously selected delayed slave emission mode, and practically inhibits the repeating emission operation. More specifically, when the repeating emission mode is normally selected, the emission frequency, and the number of times of emission must be input. However, in the slave emission mode, these parameters are ignored. Therefore, slave emission is performed only once. When the slave emission mode is canceled, the repeating emission mode is validated, and the number of times of emission and the emission frequency can be input.

In this embodiment, both the slave emission mode and the repeating emission mode can be set by the electronic flash device side. One of these modes may be set by the camera body side, and the mode information set by the camera body side may be transmitted to the electronic flash device via a data communication function.

Having described specific embodiments of the present invention, it is to be understood that many variations will occur to those skilled in the art within the scope of the appended claims.

What is claimed is:

1. An electronic flash device with a slave emission function for use in conjunction with a camera, comprising:

a light-receiving circuit to start slave emission in response to a steep leading edge of an optical signal;

a light-emitting unit to irradiate illumination light for a photographic operation onto an object;

an attachment member to engage said flash device with the camera;

a detection device to detect an attachment state of said attachment member to the camera;

a light emission stopping device when said detection device detects that the attachment member is mounted on the camera, stop the light emission by said light-emitting unit in response to light received by said light-receiving unit; and a communication device to communicate between the camera and the electronic flash device whether said electronic flash device should operate in a slave-emission mode.

2. A device according to claim 1, wherein said attachment member comprises an electrical contact.

3. A device according to claim 1, wherein said detection means detects the attachment state to the camera on the basis of a state of an electrical contact.

4. A device according to claim 1, wherein said detection means and said light emission stopping means comprise a microcomputer.

5. An electronic flash device with a slave emission function for use in conjunction with a camera, comprising:

a light-receiving circuit to start slave emission in response to a steep leading edge of an optical signal;

a light-emitting unit to irradiate illumination light for a photographic operation onto an object;

detection device to detect whether said electronic flash device is connected to said camera in order to determine in what operational mode the flash device is to operate;

a timer circuit to start a measurement operation of a predetermined period of time when said light-receiving circuit receives the steep leading edge of the optical signal; and a light reception invalidating circuit to, when said light-receiving circuit receives a steep leading edge of another optical signal optical signal during the measurement operation of said timer circuit, invalidate the received optical signal, wherein said detection device acts as a channel of communication between said camera and said electronic flash device so as to allow said electronic flash device to determine said operational mode.

6. A device according to claim 5, wherein said timer circuit comprises a software circuit incorporated in a microcomputer.

7. A device according to claim 5, wherein said light reception invalidating comprises a microcomputer.

8. An electronic flash device with a slave emission function for use in conjunction with a camera, comprising:

a light-receiving unit for receiving a steep optical signal;

a light-emitting unit slave-emit illumination light toward an object in response to the illumination optical signal received by said light-receiving unit;

an attachment member used to both attach and detach said device to and from a camera;

a detecting device to detect whether said electronic flash device is engaged with said camera;

a data communication function unit to exchange various data including photographing information with the camera via said attachment member when said flash device is attached to said the camera to exchange date when said flash device is not attached to said camera via said light-receiving unit, and to set a state allowing pre-emission in response to at least selection by the camera of a pre-emission photographing mode in which the pre-emission is performed prior to main emission; and a pre-emission inhibition unit to inhibit the pre-emission when a slave emission mode is selected even when the pre-emission photographing mode is selected by the camera.

9. A device according to claim 8, wherein said data communication function unit realizes TTL light control in which luminance information of an object is acquired by the pre-emission, and the main emission is performed on the basis of the acquired information.

10. A device according to claim 8, wherein said data communication function unit and said pre-emission inhibition unit comprise a microcomputer.

11. An electronic flash device with a slave emission function for use in conjunction with a camera, comprising:

a light-receiving unit to receive a steep optical signal;

a light-emitting unit to slave-emit illumination light toward an object in response to the optical signal received by said light-receiving unit;

a mode setting unit to select an emission mode in which said flash device operates when said flash device is one of attached and detached to said camera;

a repeating emission invalidating unit to invalidate setting data of the number of times of emission and an emission frequency, and allowing light emission only once, if a slave emission mode is already selected even when a repeating emission mode for emitting light a plurality of times during a film exposure is selected by said mode setting unit; and a communication device to communicate between the camera and the electronic flash device whether said electronic flash device should operate in a slave-emission mode.

12. A device according to claim 11, wherein an invalidating operation of said repeating emission invalidating unit is automatically inhibited when the slave emission mode is canceled.

13. A device according to claim 11, wherein said repeating emission invalidating unit comprises a microcomputer.

14. An electronic flash device with a slave emission function for use in conjunction with a camera, comprising:

a light-receiving unit to receive a steep optical signal;

a light-emitting unit to slave-emit illumination light toward an object in response to the optical signal received by said light-receiving unit;

a mode setting unit to select an emission mode in which said flash device operates when said flash device is one of attached and detached to said camera;

an attachment member used to both attach and detach said device both to and from said camera;

a data communication function unit to exchange various data including photographing information with the camera via said attachment member, and to set a state allowing repeating emission in response to at least selection by the camera of a repeating emission mode in which light emission is performed a plurality of times during a film exposure, and to communicate between the camera and the electronic flash device whether said electronic flash device should operate in a slave-emission mode; and a repeating emission invalidating unit to invalidate setting data of the number of times of emission and an emission frequency, and to allow light emission only once, if a slave emission mode is already selected by said mode setting unit even when the repeating emission mode is selected by the camera.

15. A device according to claim 14, wherein an invalidating operation of said repeating emission invalidating unit is automatically inhibited when the slave emission mode is canceled.

16. A device according to claim 14, wherein said data communication function unit and said repeating emission invalidating unit comprise a microcomputer.

* * * * *

UNITED STATES PATENT AND TRADEMARK OFFICE
CERTIFICATE OF CORRECTION

PATENT NO. : 5,794,082
DATED : August 11, 1998
INVENTOR(S) : Hideki Matsui, et al.

It is certified that error appears in the above-indentified patent and that said Letters Patent is hereby corrected as shown below:

Column 10,     line 49, (claim 1), after "device" insert
                              --to,--.

Column 11,     line 5, (claim 5), before "detection device"
                             insert --a--;
                  line 27, (claim 7), after "invalidating"
                             insert --circuit--;
                  line 30, (claim 8), change "for receiving" to
                             --to receive--;
                  line 31, (claim 8) after "unit" insert
                             --to--.

Signed and Sealed this

Twenty-ninth Day of December, 1998

Attest:

BRUCE LEHMAN

*Attesting Officer*        *Commissioner of Patents and Trademarks*